United States Patent [19]
Nakamura et al.

[11] Patent Number: 5,299,027
[45] Date of Patent: Mar. 29, 1994

[54] METHOD AND APPRATUS FOR DECODING AND PRINTING CODED IMAGE, AND FACSIMILE APPARATUS, FILING APPARATUS AND COMMUNICATION APPARATUS USING THE SAME

[75] Inventors: Kozo Nakamura, Hitachiota; Yasushi Yokosuka, Nakaminato; Yasuyuki Kozima, Hitachi, all of Japan

[73] Assignee: Hitachi, Ltd., Tokyo, Japan

[21] Appl. No.: 800,032

[22] Filed: Nov. 29, 1991

[30] Foreign Application Priority Data

Nov. 30, 1990 [JP] Japan ................................. 2-329059
May 23, 1991 [JP] Japan ................................. 3-118346

[51] Int. Cl.$^5$ ............................................. H04N 1/00
[52] U.S. Cl. ................................... 358/403; 358/426; 358/434; 358/444; 358/404; 358/261.1; 358/427
[58] Field of Search ................... 358/261.1, 426, 261.2, 358/261.3, 261.4, 427, 428, 429, 430, 431, 432, 433, 439, 435, 436, 444, 404

[56] References Cited

U.S. PATENT DOCUMENTS

| | | | |
|---|---|---|---|
| 4,264,933 | 4/1981 | Kurahayashi et al. | 358/427 |
| 4,677,649 | 6/1987 | Kunishi et al. | 358/426 |
| 4,864,414 | 9/1989 | Nishiyama et al. | 358/261.4 |

*Primary Examiner*—Edward L. Coles, Sr.
*Assistant Examiner*—Fan Lee
*Attorney, Agent, or Firm*—Antonelli, Terry, Stout & Kraus

[57] ABSTRACT

An apparatus for decoding a coded image into a pixel image and printing the pixel image at an essentially constant speed without using decoding means which decodes the coded image faster than a printing speed and pixel memory means for storing at least one page of pixel information. Decoding amount calculation means for calculating the decoding amount of the code to be decoded is provided, and compare means monitors whether the decoding amount exceeds the printing amount of the pixels to be printed and the code is converted to other code depending on the comparison result. The decoding means needs only receive the converted code from the code memory means and decode it to the pixel information. Thus, the constant speed printing apparatus is attained without high speed decoding means and one-page memory.

14 Claims, 7 Drawing Sheets

METHOD AND APPRATUS FOR DECODING AND PRINTING CODED IMAGE, AND FACSIMILE APPARATUS, FILING APPARATUS AND COMMUNICATION APPARATUS USING THE SAME

BACKGROUND OF THE INVENTION

The present invention relates to an apparatus, for decoding a coded image and printing it, and more particularly to a coded image printing apparatus such as a facsimile apparatus for processing a document image at a high speed.

Prior art to the present invention includes: DENSHI GIJUTSU (Electronic Technology) April 1988 (pages 64–70) "Introduction of ASIC Observed in an Ultra-High Speed Facsimile Apparatus"

In the prior art facsimile apparatus described in the above publication, which uses a printing system (for example, a laser beam printer) for printing at a constant speed, a high speed decoding processor is required in order to decode a signal in a shorter process time than the print time.

In addition, when the amount of code for a particular line after the encoding is larger than the amount of pixels prior to the encoding so that a compression effect by the encoding is negative (negative compression), it is necessary to decode that line faster than the printing time of that line. To this end, a very high speed decoding processor is required.

SUMMARY OF THE INVENTION

It is an object of the present invention to provide an apparatus which decodes a coded image at a higher speed than a printing speed so that the coded image is printed at an essentially constant speed.

In order to solve the above problem, in the method for printing pixels generated by decoding a coded image in accordance with the present invention, the coded image signal is sampled for each decoding and/or printing process unit and changed to another code in accordance with the information resulting from the decoding of the sampled image signal.

In accordance with the present invention, there is provided a coded image printing apparatus for printing a pixel signal derived by decoding a coded image signal at an essentially constant speed, comprising:

(a) a provisional decoding circuit for decoding the coded image signal into pixels for each decoding and/or printing process unit;

(b) a count circuit for counting the code amount or the transition point amount of the pixel color signal of each decoding and/or printing process unit;

(c) a calculation circuit for calculating the decoding amount of each decoding and/or printing process unit based on the code amount or the transition point amount counted by said count circuit;

(d) a compare circuit for comparing the calculated decoding amount with the printing amount required to print the pixels;

(e) a conversion circuit for converting the code into other code when the calculated decoding amount is larger than the printing amount;

(f) a first memory circuit for storing the code converted by said conversion circuit;

(g) a decoding circuit for decoding the code stored in said first memory circuit to pixels;

(h) a second memory circuit for storing the pixels decoded by said decoding circuit; and (i) a printer for printing the pixels stored in said second memory circuit.

The decoding amount-calculation circuit calculates the amount of decoding of the code to be decoded, and the compare circuit determines whether the decoding amount exceeds the printing amount of pixels to be printed. The conversion circuit converts the code into another code when the calculated decoding amount is larger than the printing amount. The converted code is stored in the code memory circuit. The decoding circuit receives the converted code from the code memory circuit, decodes it into the pixel information and supplies it to the pixel memory circuit. The stored pixels are supplied to the printer for printing.

In the receiving station apparatus to which the document is transmitted by the circuit for encoding the information into a provisional conversion code, the code which is previously known that the decoding time does not exceed the printing time is decoded without converting it to another code.

DESCRIPTION OF THE PREFERRED EMBODIMENTS

In the following embodiments, the following assumption is made in order to make the explanation simpler although it is not restrictive. It is assumed that a code prior to the conversion is the MMR code which is most complex and takes the longest decoding time among the MH code, the MR code and the MMR code, which are the international standard codes defined by the CCITT Recommendations T.4 and T.6 applied to the facsimile systems. It is assumed that the code after the code which results conversion is a non-compression mode code which is simplest code and takes a shortest decoding time. An example of a constant speed printer is an optical printer (laser beam printer). Since the laser beam printer is a constant speed printing system for each line to be printed and the decoding process is performed line by line, it is assumed that a block which is a unit for processing the image to be encoded and decoded is a line.

Embodiment 1

Figure 1:
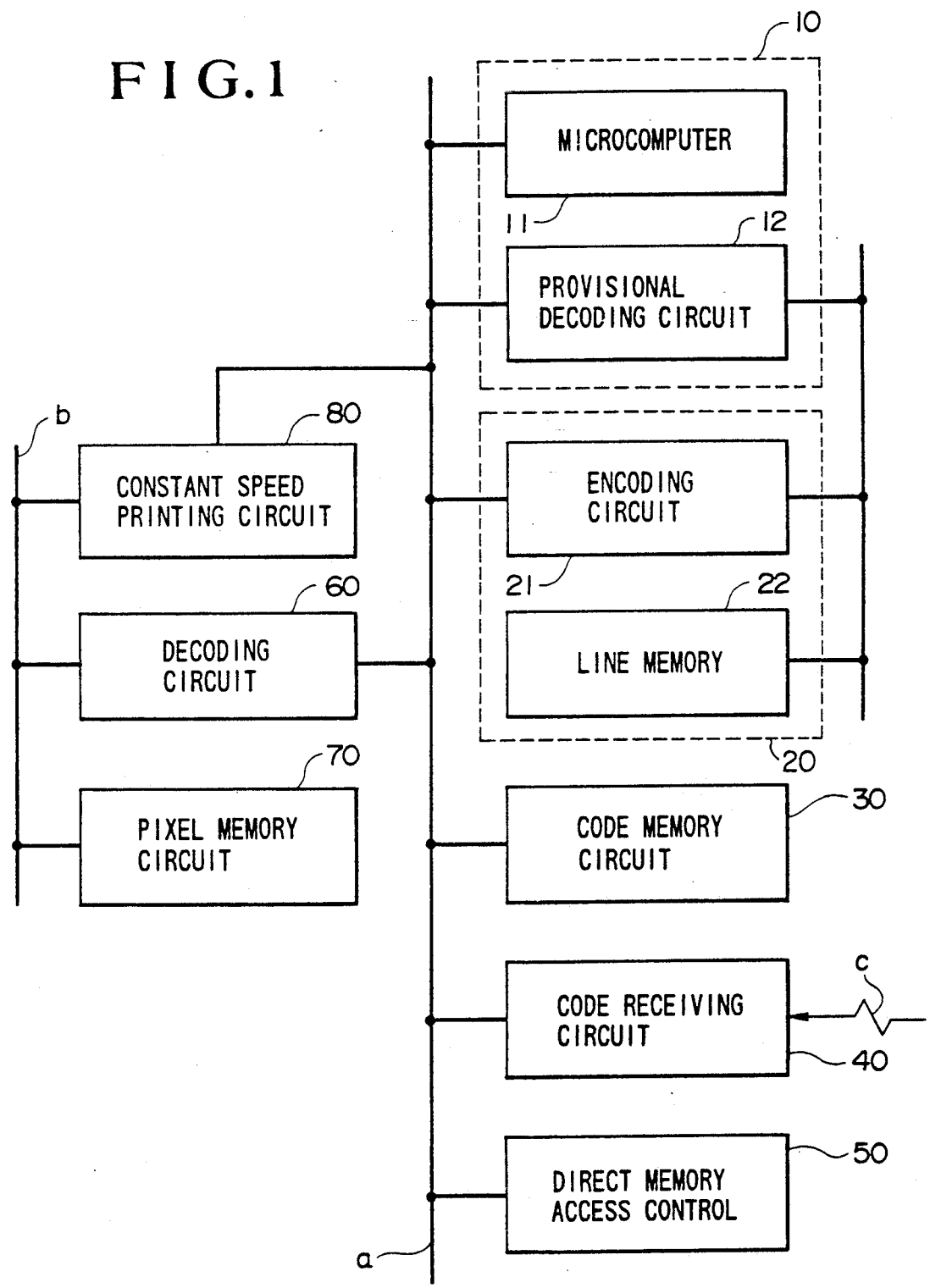
FIG. 1 shows a block diagram of one embodiment of the present invention.

FIG. 1 shows a block diagram of an overall facsimile apparatus in accordance with a first embodiment of the present invention.

In the present embodiment 1, it is assumed that the term decoding amount refers to the decoding time per line of the decoding circuit 60, and the term printing amount refer to the printing time per line of the constant speed printer 80. In FIG. 1, numeral 10 denotes a unit for effecting a decodimg time calculation and a compare operation. It calculates the decoding time per line of the decoding circuit 60 and compares the calculated decoding time with the printing time. The decoding time calculation circuit 10 comprises a microcomputer 11 for controlling the overall facsimile system, under a control program, and provisional decoding circuit 12. The provisional decoding circuit 12 has a function to decode the code and calculate the processing amount for decoding the code (for example, the time required for the decoding, the amount of the code, the amount of transition points of the pixel color, etc.). It may be implemented by a DICEP (Document Image Compression and Expansion Processor), such as Hitachi image processing LSI HD63085. Numeral 20 denotes a conversion circuit, which converts a line having a longer decoding time than the printing time to a provisional code, such as a non-compression mode code. The conversion circuit 20 comprises a portion of the program of the microcomputer 11, encoding circuit 21 and a line memory 22. The line memory 22 stores the pixel signal decoded by the provisional decoding circuit 12. Numeral 30 denotes a code memory circuit which stores the code converted by the conversion circuit 20. Numeral 40 denotes a code receiving circuit which receives the coded document information sent from a transmitting facsimile system (not shown). For example, when the communication line c is a telephone network, it may comprise a NCU (network control unit) and a Modem (modulator/ demodulator). Numeral 50 denotes a direct memory access controller (DMAC), which transports data between memories and I/0 (Input/Output circuit) connected to a microcomputer bus a by hardware without interrupting the processor in the microcomputer 11. The data transport is done at a high speed because the processor is not involved. The DMAC may be a commercially available LSI. Numeral 60 denotes a decoding circuit which has a function to decode the code into pixels. The decoding circuit may be the same LSI as the processor of the provisional decoding circuit 12 although another processor may be used. Numeral 70 denotes a pixel memory circuit which stores the pixel signal generated by the decoding circuit 60. The pixel memory circuit 70 usually has a memory capacity of two lines or more and it has the function of a two-plane (two-port or dual port) buffer to parallelly store the pixel signal of one line generated by the decoding circuit 60 and supply the stored pixel signal of another line to the constant speed printer 80. Numeral 80 denotes the constant speed printer which is an optical printer for printing a page line by line at a constant speed, for which purpose a laser beam printer is usually used.

The operation of the embodiment 1 is now explained. The microcomputer 11 samples the code received by the code receiving circuit 40, transfers it to the provisional decoding circuit 12 and counts the amount of transferred code for each decoding unit. The provisional decoding means 12 decodes the input code into pixels and supplies the generated pixels to the line memory 22. It detects, the punctuation of the code between each lines and indicates the end of decoding of one line to the microcomputer 11 (notice of end of decoding). The provisional decoding circuit 12 parallelly carries out the error detection of the code when the microcomputer 11 receives the notice of end of decoding, and it determines the amount of code of one line by calculating the amount of code transferred from the code receiving circuit 40 to the provisional decoding circuit 12. The decoding time can be readily calculated based on the amount of code by following the reverse process of the encoding process. Namely, the code is decoded by referring to a code table. The transition position of the pixel color is calculated based on the relative distance and the run length obtained by decoding the code, and the original pixels are generated in accordance with the position data. Since the time required for carrying out such a process is previously known, the decoding time can be determined based on the amount of code. The microcomputer 11 compares the calculated decoding time with the printing time per line of the constant speed printer 80 to determine if the decoding time is longer or not, and depending on the comparison result, it commands the encoding circuit to change the decoding process, for example, to convert to another code. If the decoding time is longer, it commands the encoding circuit 21 to encode the pixels by a non-compression mode, and otherwise it commands the encoding circuit 21 to encode the pixels by the MMR code. The encoding circuit 21 encodes the pixel signals in the line memory 22 by using the encoding method designated by the microcomputer 11 and supplies the converted code to the code memory circuit 30. When the above process is completed for a block of the document image, for example, one page, the code of all lines has been stored in the code memory circuit 30. Since the code is converted to another code before it is decoded for printing in order that the decoding time is not longer than the printing time, it is assured that the decoding time does not exceed the printing time. When at least one page of converted code is supplied to the code memory circuit 30, the microcomputer 11 issues a decode command to the decoding circuit 60 and a one-page printing command to the constant speed printer 80. The microcomputer 11 issues a code transfer command to the direct memory controller (DMAC) 50 to transfer the code from the code memory circuit 30 to the decoding circuit 60. The decoding circuit 60 decodes the converted code into a pixel signal and supplies the pixel signal to the pixel memory circuit 70. The constant speed printer 80 receives the pixel signal stored in the pixel memory circuit and prints one page of pixel signal line by line at a constant speed. The pixel memory circuit 70 has a capacity of storing at least two lines of pixel data and functions as a two-plane buffer which permits the writing of the decoded pixels and the reading of the pixels to be printed, simultaneously.

In accordance with the present embodiment, it is assured that the decoding time per line is always shorter than the printing time. Accordingly, the twoline buffer is sufficient to store the pixels to be printed of the received coded document image and the effect of the small capacity memory and a constant speed printing is attained.

Figure 2:
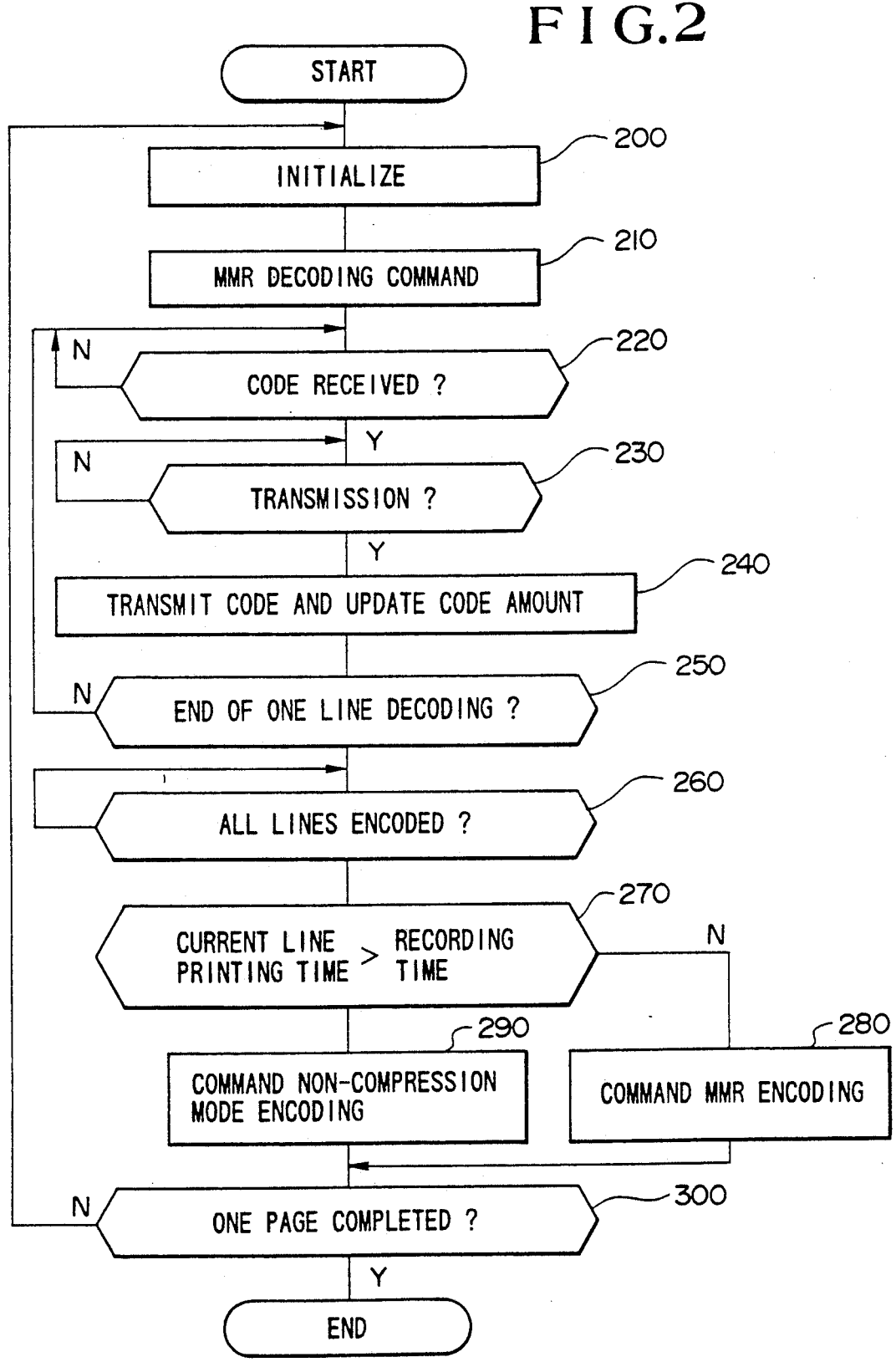
FIG. 2 shows a process flow chart of a microcomputer 11.

FIG. 2 shows a process flow of the decoding time per line calculation and the conversion code determination by the microcomputer 11.

In a step 200, initialization is carried out to clear a counter (code amount counter) which counts the amount of code per line. In a step 200, the decoding of the MMR code is commanded to the provisional decoding circuit 12. Thus, the provisional decoding circuit 12 starts the decoding of one line of MMR code in response to the command. Then, whether the next line of the received code is present in the code receiving circuit, 40 or not is determined (step 220). If the next line of the received code is present, whether the provisional decoding circuit 12 is ready to receive the code or not is determined (step 230). If it is ready, the code is transferred from the code receiving circuit 40 to the provisional decoding circuit 12 and the code amount counter is incremented by the amount of code transferred (step 240). Then, whether the provisional decoding means has completed one line of decoding or not is determined (step 250). If one line of decoding has not yet been completed, the process returns to the step 220 and the steps 220 to 250 are repeated. When one line of decoding is completed, the process proceeds to a step 260. In the step 260, whether the encoding means 21 has completed the coding of the previous line or not is determined. If it has not, the process waits until it is completed. When it is completed, the process proceeds to a step 270 to read out the code amount of one line from the code amount counter and calculate the decoding time of the decoded one line of code. The decoding time is compared with the preset printing per line of the constant speed printer 80, and if the decoding time is longer, the process proceeds to a step 290, and otherwise the process proceeds to a step 280. In the step 280, the MMR encoding command is issued to the encoding circuit 21 to convert one line of pixels stored in the line memory 22 to the MMR code. In a step 290, the non-compression mode encoding command is issued to the encoding circuit 21 to convert one line of pixels stored in the line memory 22 to the noncompression mode code. The code encoded in the steps 280 and 290 are stored in the code memory circuit 30. Then, whether one page has been processed or not is determined (step 300), and if it is not yet processed, the process returns to the step 200 to repeat the above steps. Since the code is converted to another code which may be decoded at a fast rate before decoding in order to prevent the decoding time from being longer than the printing time, the decoding time for each line does not exceed the printing time per line.

In the step 270, the decoding time is calculated based on the amount of code and it is compared with the printing time. Alternatively, the amount of code corresponding to the printing time (the time converted code amount) may be preset and the timeconverted code amount and the received code amount may be compared. In this method, the decoding time and the printing time are indirectly compared.

In the present embodiment, the microcomputer 11 transfers the received code to the provisional decoding circuit 12. Alternatively, it may be done by the direct memory access controller (DMAC) 50. In this case, the amount of one line of code may be known from the amount of code transferred by the direct memory access controller (DMAC) 50. In the present embodiment, other commands issued by the microcomputer 11 are:

① decoding command issued to the decoding circuit 60 when one page of converted code is stored in the code memory circuit 30.

② a print command issued to the constant speed printer 80.

③ a code transfer command to transfer the code from the code memory circuit 30 to the decoding circuit 60, issued to the direct memory access controller (DMAC) 50.

In the above process flow, among others, the process to the next page of the document image can be executed even during the printing operation of the constant speed printer because the code transfer from the code memory circuit 30 to the decoding circuit 60 and the code transfer from the code memory circuit 30 to the provisional decoding circuit 12 can be parallelly done by time-sharing the microcomputer bus a.

Embodiment 2

A second embodiment which uses the amount of code per line as the decoding time will be now explained. The unit denoted by numeral 10 in FIG. 1 is replaced by a unit which performs code amount calculation and a compare operation and the function of the decoding circuit 60 is replaced by a function of decoding the non-negative compression line within the printing time. The elements 20 to 80 are identical to those of FIG. 1, so the FIG. is omitted in the drawing.

The operation of the embodiment 2 is explained with reference to FIG. 1.

The process to calculate the amount of one line of code is the same as that in the Embodiment 1, but what is to be determined based on the amount of code is different from the Embodiment 1. Namely, whether the coding of the received information involves negative compression or not is determined. If does involve negative compression, it is determined that the decoding time is longer and the non-compression mode encoding is commanded to the encoding circuit 21, and otherwise the MMR encoding is commanded. The encoding circuit 21 encodes the pixels in the line memory 22 into a code in accordance with the command from the microcomputer 11 and supplies the converted code to the code memory circuit 30. The above process is repeated for the entire block (one page in the present-embodiment) of the document image so that coded data subject to the non-negative compression codes for all lines are stored in the code memory circuit 30.

In the present embodiment, since the negative compression line of the MMR code (the amount of the code is three times that of the pixels at maximum) is converted to the non-compression mode, the following effects are attained as compared to the decoding of the negative compression line relative to the printing time.

① The decoding time is reduced to below $\frac{1}{3}$ at maximum.

② There is no need for providing a one-page pixel memory (page memory).

③ Essentially constant speed printing is attained by only the two-line pixel printing buffer.

④ The memory capacity of the code memory circuit 30 is reduced to $\frac{1}{3}$ at maximum.

⑤ The time to transfer the code from the code memory circuit 30 to the encoding circuit 60 through the microcomputer bus a is reduced to $\frac{1}{3}$ at maximum, compared to the case where the code is not converted to the non-compression mode code.

⑥ The load of the microcomputer bus a for the code transfer is reduced to $\frac{1}{3}$ at maximum.

The operation of the embodiment 2 will be now explained.

The process flow of the microcomputer 11 is the same as that of FIG. 2 if the function of the step 270 is replaced by "the decision as to whether it is the negative compression or not", so the FIG. is omitted in the drawing. In the negative compression decision step 270, the amount of one line of code is detected by referring to the code amount counter to determine if the code involves negative compression or not. If it is negative compression, the process proceeds to step 290, and otherwise the process proceeds to step 280. In the step 280, the MMR encoding command is issued to the encoding circuit 21 to convert one line of pixels stored in the line memory 22 to the MMR code. In the step 290, the non-compression mode encoding command is issued to the encoding circuit 21 to convert one line of pixels stored in the line memory 22 to the non-compression mode code. The codes converted in the steps 280 and 290 are stored in the code memory circuit 30. In a step 300, whether one page has been processed or not is determined, and if it has not been completed, the process returns to the step 200 to repeat the above steps. Through the above steps, there is no negative compression line in the code memory circuit 30. Thus, page printing at essentially a constant speed can be attained without providing a page memory which stores one page of pixels so long as the decoding circuit 60 which decodes the non-negative compression line in the printing time is provided.

Embodiment 3

Figure 3:
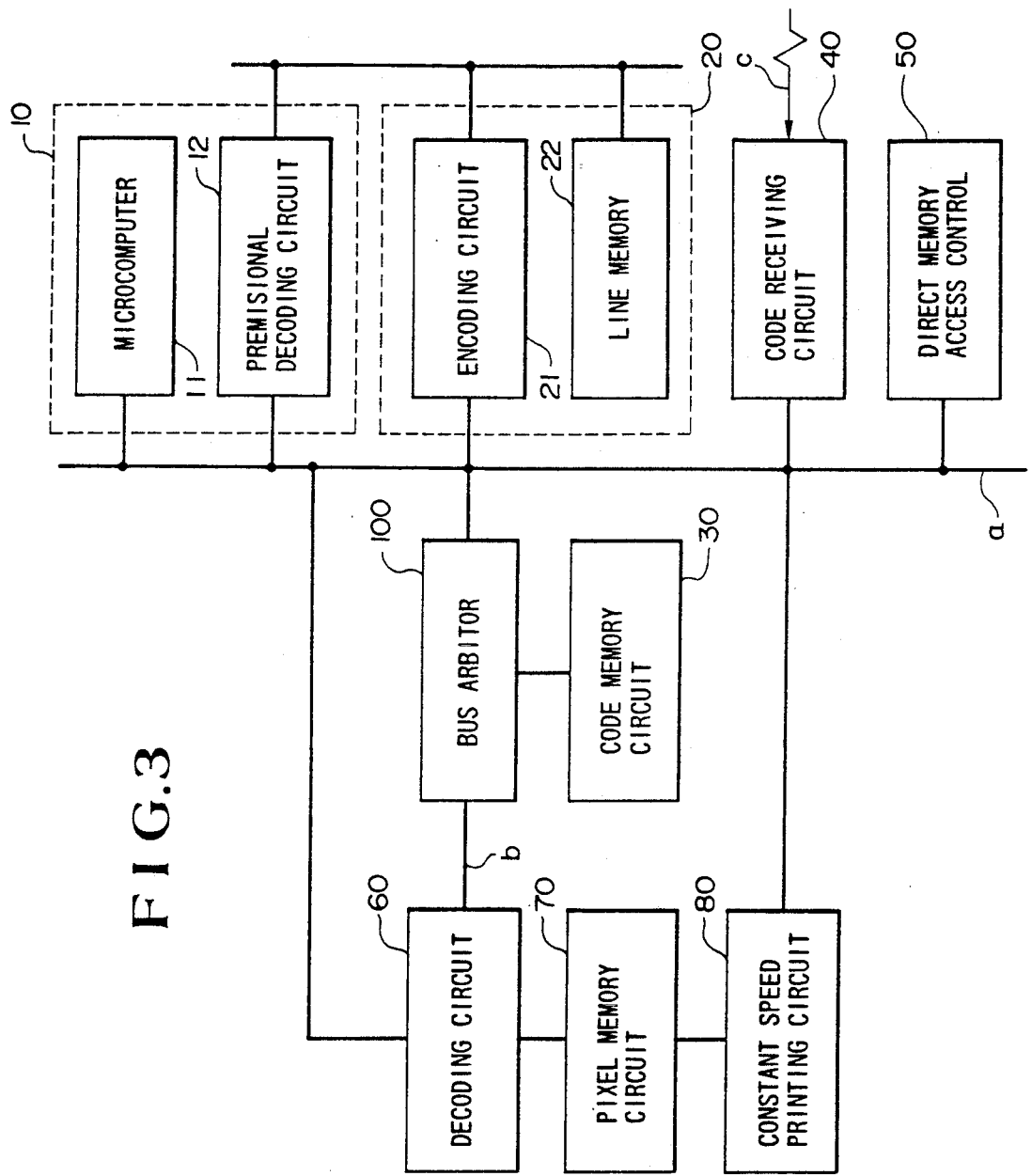
FIG. 3 shows a block diagram of another embodiment of the present invention.

FIG. 3 shows a third embodiment of the present invention. Circuits 10 to 80 are identical to those of FIG. 1, and so the same reference numerals, and the explanation of the operations thereof are omitted. A code bus b is used to transfer the code from the code memory circuit 30 to the decoding circuit 60. Numeral 100 denotes a bus arbitor which is a bus switch to connect a bus which first accessed the code memory circuit 30 to the code memory circuit 30 to prevent competition of access for the code memory circuit 30. When both the microcomputer bus a and the code bus b simultaneously access the code memory circuit, the access from the code bus b has a higher priority. Thus, the processing of the decoding circuit 60 is given a higher priority and the decoding for printing is attained at a high speed. In the present embodiment, the pixel memory circuit 70 has a two-plane (dual port) configuration so that the decoding means 60 can freely access the pixel memory circuit 70 even when the pixels are being supplied to the constant speed printer 80.

In accordance with the Embodiment 3, since the code bus b is separated from the microcomputer bus a, the microcomputer 11 can convert the code at high speed without being affected by the code transfer to the decoding circuit 60.

In accordance with the Embodiment 3, since the pixel memory circuit 70 has a dual port configuration, the decoding means 60 can supply decoded code data to the pixel memory circuit 70 at high speed even when the pixel data is transferred from the pixel memory circuit 70 to the constant speed printer 80.

Embodiment 4

Figure 4:
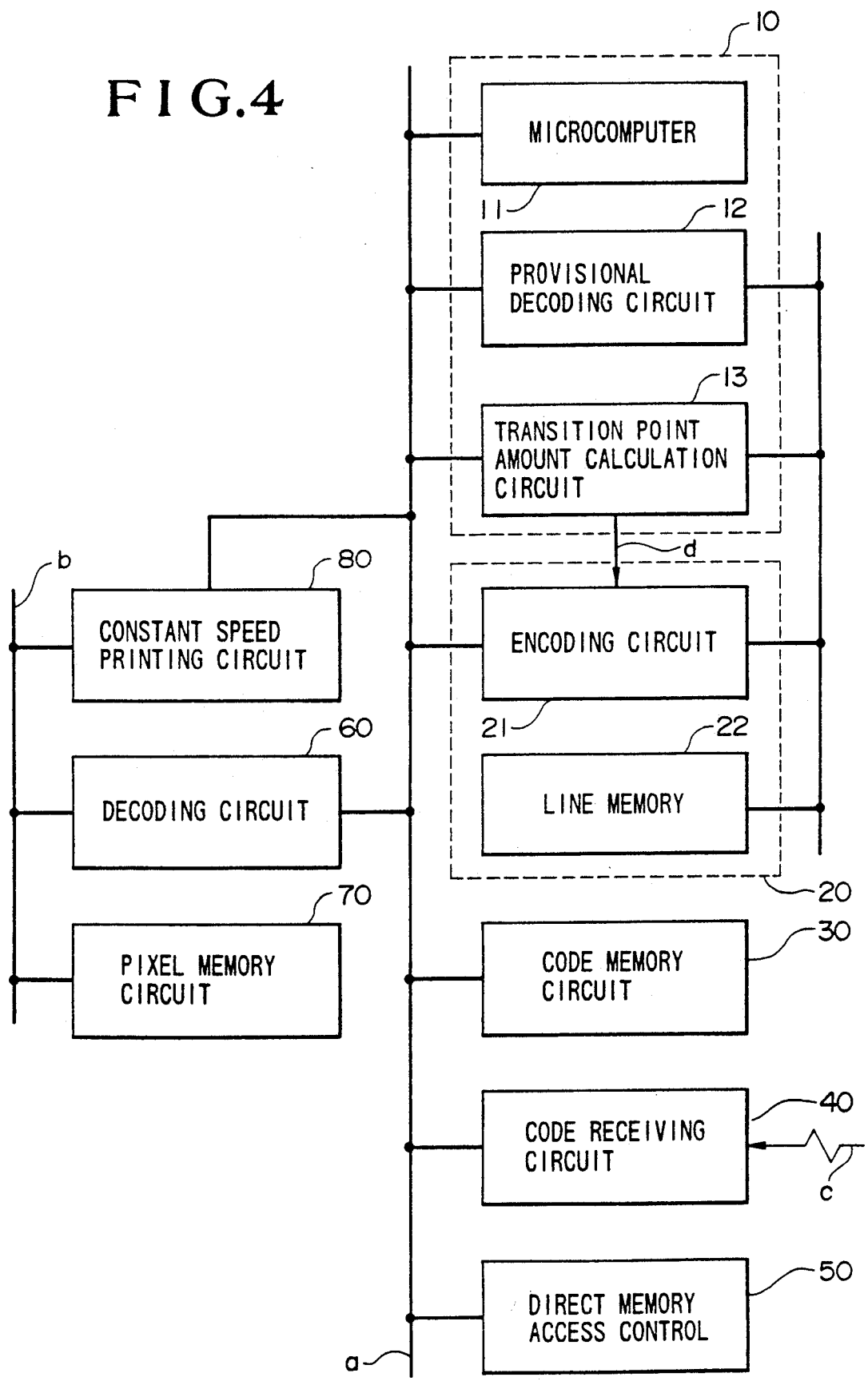
FIG. 4 shows a block diagram of a third embodiment of the present invention.

An embodiment which uses the number of transition points of the pixel color per line as the decoding amount is explained with reference to FIG. 4.

In the MH code, the MR code and the MMR code, the transition points, at which the pixels generated by scanning the document from left to right change from black pixel to white pixel or from white pixel to black pixel, are encoded. Thus, the decoding time is approximately proportional to the number of transition points (transition point amount). Accordingly, the transition point amount per line may be used as the decoding amount.

The circuit 10 in FIG. 1 is replaced by a unit which performs "transition point amount calculation and a compare operation" and the function of the decoding circuit 60 is replaced by "a function to decode within the printing time the line whose transition point amount is less than a predetermined amount". The circuits 20 to 80 are identical to those of FIG. 1 and the explanation of those circuit is omitted. When the provisional decoding circuit 12 transfers the decoded pixels to the line memory 22, the transition point amount calculation circuit 13 calculates the transition point amount included in the transferred pixels.

The operation of the Embodiment 4 will be explained with reference to FIG. 4.

The provisional decoding circuit 12 decodes the input code into pixels and supplies the generated pixels to the line memory 22. The transition point amount calculation circuit 13 calculates the transition point amount in the generated pixels. After one line has been processed, the microcomputer 11 determines whether the transition point amount for one line calculated by the transition point amount calculation circuit 13 is larger than the predetermined transition point amount or not. If it is larger, it commands the non-compression mode encoding to the encoding circuit 21, and otherwise it commands the MMR encoding. The encoding circuit 21 converts the pixels in the line memory 22 in accordance with the command from the microcomputer 11 and supplies the converted code to the code memory circuit 30. The predetermined transition point amount is determined in accordance with the capability of the decoding circuit 60 and the printing speed of the constant speed printer 80 so that it is assured that the decoding circuit 60 decodes the converted code stored in the code memory circuit 30 within the printing time. When the above process is completed for the entire page, the code memory circuit 30 now stores the codes which the decoding circuit 60 can decode within the printing time for each line.

In accordance with the present embodiment, since it is assured that the decoding time per line is always shorter than the printing time, the buffer for storing the decoded pixels of the coded document image for printing may be a one-line buffer and essentially constant speed printing is attained with a small capacity pixel memory.

In a modification of the present embodiment, the transition point amount calculation circuit 13 has a function to compare the transition point amount with a predetermined value and a function to supply the comparison result directly to the encoding circuit 21 through a signal line d, and the encoding circuit 21 encodes the pixels by either the non-compression mode or the MMR in accordance with the comparison result supplied from the signal line d. The predetermined value is set in a register in the transition point amount calculation circuit 13 by the microcomputer 11. In accordance with the present embodiment, the comparison process of the transition point amount and the predetermine value by the microcomputer 11 and the encoding command process for each line to the encoding circuit 21 by the microcomputer 11 in accordance with the comparison result are eliminated so that the load on the microcomputer is reduced and the code conversion process speed is increased.

Embodiment 5

An operation of the Embodiment 5 will be now explained.

A process flow of the microcomputer 11 in the embodiment 5 is identical to that of FIG. 2 when the function of the step 240 in FIG. 2 is replaced by the transfer of the code and the function of the step 270 is substituted by the determination as to whether the transition point amount exceeds a predetermined value or not, and hence it is not shown. In the step 270 to determine the transition point amount, the transition point amount calculation circuit 13 is referred to to read the transition point amount for one line to determine whether the transition point amount is larger than a predetermined value or not. If it is larger, the process proceeds to the step 290, and otherwise it proceeds to the step 280. In the step 280, the MMR encoding command is issued to the encoding circuit 21 to convert one line of pixels stored in the line memory 22 to the MMR code. In the step 290, the non-compression mode encoding command is issued to the encoding circuit 21 to convert one line of pixels stored in the line memory 22 to the non-compression mode code. The code converted in the step 280 or 290 is stored in the memory circuit 30. The above process is repeated for one page of lines. Through the above process, the a line having a transition point amount larger than the predetermined value is converted to the non-compression code and it is stored in the memory circuit 30. Thus, by providing the decoding circuit 60 which can decode at least those lines having a transition point amount smaller than the predetermined value, within the recording time, the constant speed printing for each page is attained without providing a page memory which can store one page of pixels.

Embodiment 6

A sixth embodiment of the present invention will be now explained. The circuits 10 to 100 are identical to those of FIG. 3 when the code receiving circuit 40 and the communication line c are replaced by the encoded document file (the same reference numerals as those of FIG. 3 are used herein), and so the operation thereof is omitted. The encoded document file 40 is a memory medium which stores the encoded document. Examples of the memory medium are a floppy disk, a hard disk and an optical disk. The code is read from the encoded document file 40, it is transferred to the encoding circuit 21, the code is converted to another code by a series of processes described in the previous embodiment so that the decoding time per line is shorter than the printing time, and the converted code is stored in the code memory circuit 30. The decoding circuit 60 decodes the code stored in the code memory circuit 30 and supplies it to the pixel memory circuit 70. The constant speed printer 80 reads the pixels from the pixel memory circuit 70 and prints them at a constant speed.

In accordance with the Embodiment 6, the encoded document stored in the memory medium can be printed at an essentially constant speed without using the page memory.

Figure 5:
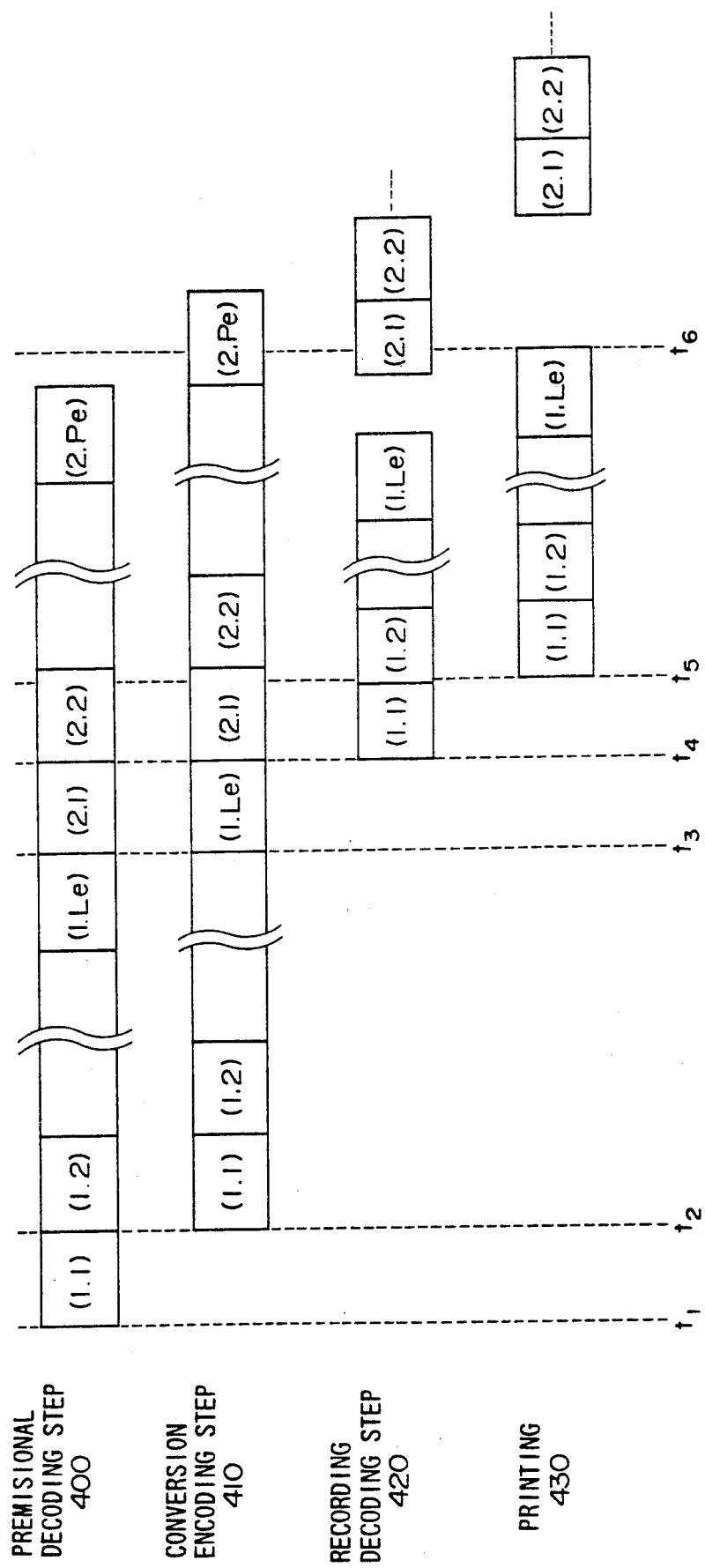
FIG. 5 shows a time chart for a processing time in the present invention.

FIG. 5 shows a time chart of the processes shown in FIGS. 1, 2, 3 and 4. The direction of time elapse of the process is from left to right on the drawing. The time chart shows the process for two pages of document image. At a time $t_1$, the provisional decoding circuit 12 starts the provisional decoding step 400 for the first line of the first page. When the provisional decoding step 400 for the first line of the first page is completed at a time $t_2$, the encoding circuit 21 starts the conversion encoding step 410 for the first line of the first page. The provisional decoding process 400 for the first page is completed at a time $t_3$, and the provisional decoding process for the first line of the second page is started. The conversion encoding step 410 for the first page is completed at a time $t_4$ and the conversion encoding step for the first line of the second page is started. At the time $t_4$, the decoding circuit 60 starts the decoding step 420 for the first line of the first page. When the decoding step 420 for the first line of the first page is completed at a time $t_5$, the constant speed printer 80 starts the printing step 430 for the first line of the first page, and the printing step 430 for the first page is completed at a time $t_6$. In the time chart, the decoding step 420 and the printing step 430 for the second page are shown only partially for simplification purpose, but they are continuously executed.

Since the provisional decoding step 400, the conversion encoding step 410, the decoding step 420 and the printing step 430 are executed parallelly, the processing time is further shortened and the entire processing speed is increased.

Embodiment 7

Figure 6:
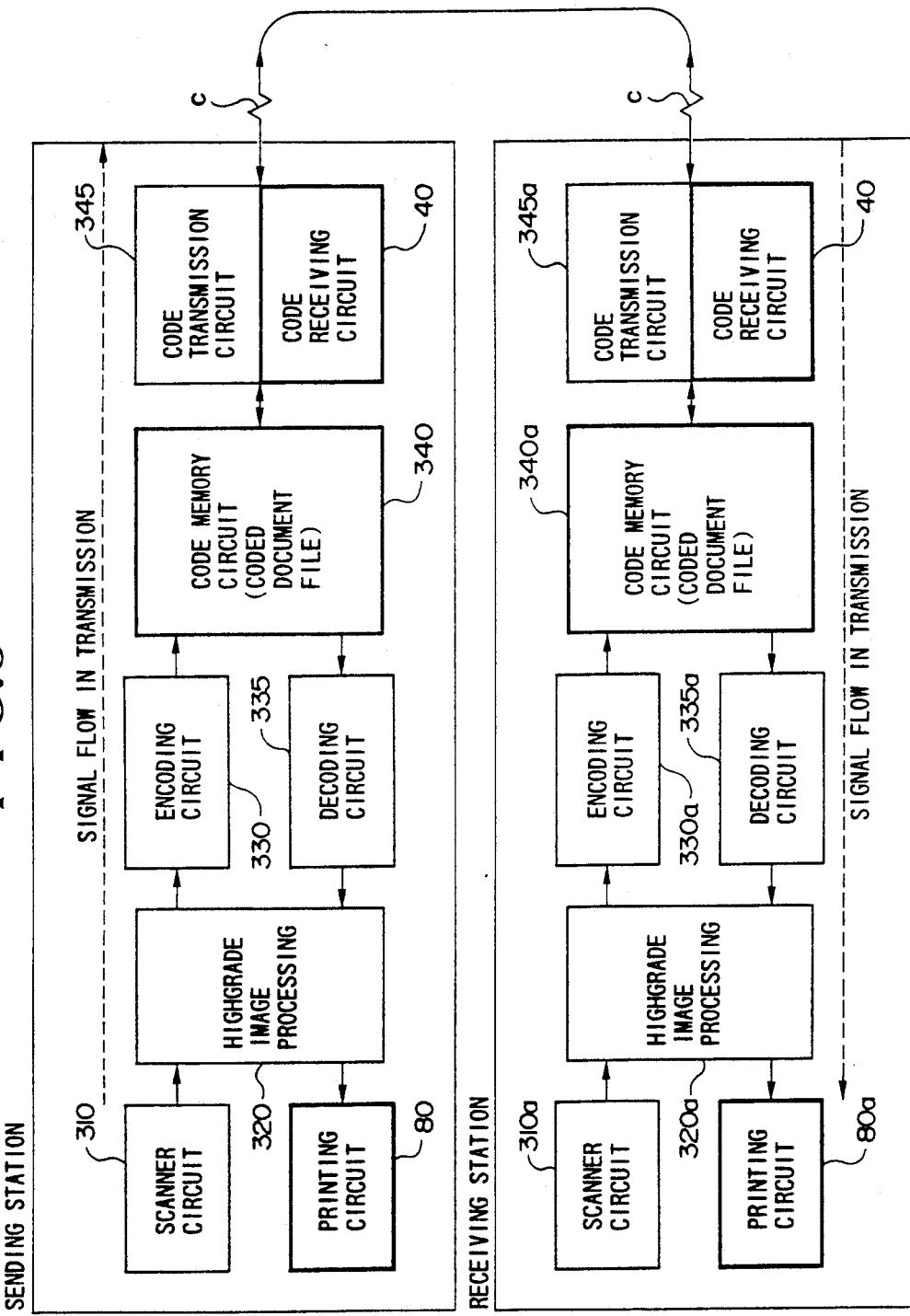
FIG. 6 shows one embodiment in which the present invention is applied to a facsimile system.

The application of the present invention, to a facsimile apparatus or a facsimile system will be now explained with reference to FIG. 6.

The facsimile apparatus normally has a scanner circuit which scans a document and generates the electrical image signal. If the image information is in the form of an electrical signal, the scanner circuit is not necessary. An example is where an image processed by a personal computer is to be transmitted as image information. At a source station (sending station) which transmits a document, the video signal processing circuit 320 executes video signal processing (for example high-precision shading distortion correction) on the electrical image signal and generates a pixel signal, and the pixel signal is compressed by the encoding circuit 330 and temporarily stored in the code memory circuit (encoded document file) 340. It is then sent to the transmission line by the modulation/transmission controller 345 in accordance with a communication protocol. The code transmitted to the destination facsimile apparatus (receiving station) through the transmission line is decoded to the original pixel by the reverse process to that in the transmitting station. The reproduced image data (the original pixel) is printed on a sheet by the printer 80. In accordance with the Embodiment 7, when the present invention is used as the receiving station, the code decoding time does not exceed the printing time so that the document image sent from the sending station can be printed without interrupting the printing operation. Further, since the document scanning operation at the sending station and the document printing operation at the receiving station are executed timingly, the document send operation and the utilization of the transmission line are efficiently done and the overall system operates smoothly without waste because of interruption by any trouble, such as fullness of the facsimile system line. Further, since the decoding time may follow the printing time of the printing unit, the printing may be completed in a shorter time if a high speed printing unit is used. Thus, high speed facsimile document transmission/ reception is attained and the attendants at the sending station and the receiving station can save time. For example, if a document of size A4 is read in one second and the facsimile apparatus at the receiving station has a plain paper printing unit having a printing speed of 60 sheets per minute for the same size, the document is printed in approximately one second because the encoding/decoding time and the transmission time are very small. Thus, a real time transmission facsimile system is attained so that the document scanned at the sending station is printed at the receiving station essentially simultaneously with the completion of the document scanning.

Embodiment 8

Figure 7:
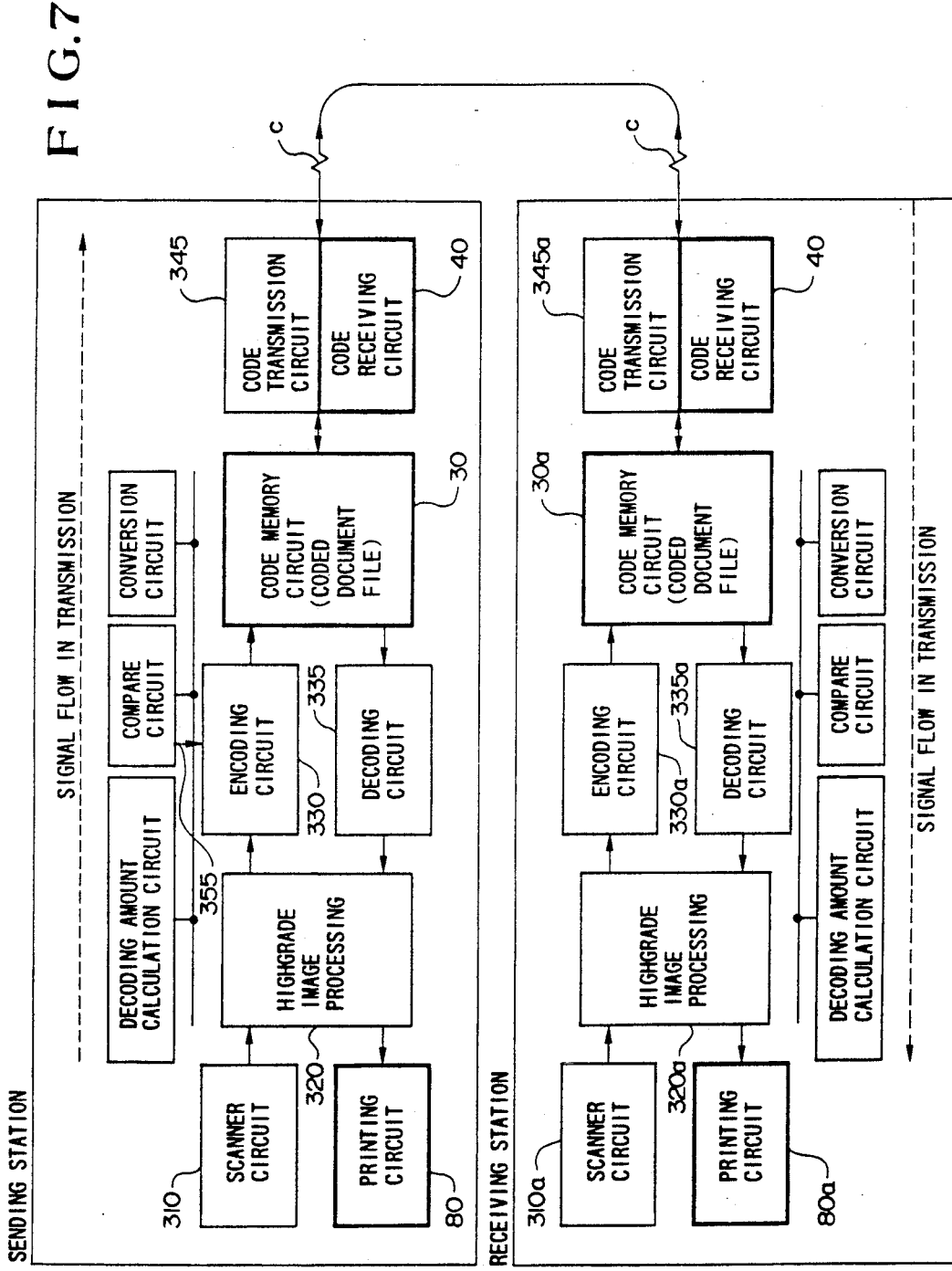
FIG. 7 shows another embodiment in which the present invention is applied to the facsimile system.

Another application of the present invention to the facsimile system is now explained with reference to FIG. 7.

In the Embodiment 1, the code is temporarily converted to another code (provisionally converted code) to prevent the decoding time from being longer than the printing time so that it is assured that the decoding time does not exceed the printing time. This principle is applied to the facsimile apparatus at the destination station (receiving station). At the document sending station, the provisionally converted code whose decoding time does not exceed the printing time is transmitted as it is, and the receiving station receives the provisionally converted code as it is and decodes it as it is without modifying the code. FIG. 7 shows a facsimile system which uses the above principle and shows a flow of the above communication. A notice of provisional signal is sent to the receiving station with the code data as status information 355 so that the apparatus at the sending station and the receiving station can recognize whether the code just sent is the provisional code or not. Such a convention is needed only between the sending station and the receiving station without regard to the type and the manufacturers of the apparatus.

In accordance with the present invention, the encoded image block which cannot be decoded in the printing time is converted to the code which can be decoded in the printing time of the image block. Accordingly:

① No high speed decoding circuit is required for decoding the non-converted code in the printing time.

② No memory is required for storing one page of pixel signal.

③ A constant speed printing of the encoded document is attained.

④ The cost of the constant speed printing unit is reduced.

⑤ The encoded document can be efficiently stored in the memory because the negative compressed image block is converted to a non-compression mode code.

⑥ Since the document is encoded to the provisionally converted code at the sending station and the notice of conversion and the provisional code are sent to the receiving station, it is not necessary for the receiving station to compare the decoding time and the printing time or reconvert the code to the provisional code, the processing time is shortened.

What is claimed is:

1. A method of processing a coded signal to obtain a pixel signal for printing, said coded signal having been produced by predetermined coding of an image signal, comprising the steps of:
  (a) provisionally decoding the coded signal to reproduce said image signal;
  (b) counting an amount of code in at least one line of the coded signal being decoded in step (a);
  (c) calculating the time required for decoding the amount of code counted in step (b);
  (d) comparing the calculated decoding time with a time required to print pixels obtained by decoding the code counted in step (b); and
  (e) converting the image signal obtained in step (a) to another coded signal which is coded using another coding than said predetermined coding, when the calculated decoding time is larger than said printing time.

2. A method of processing a coded signal to obtain a pixel signal for printing said coded signal having been produced by predetermined coding of an image signal, comprising the steps of:
  (a) provisionally decoding the coded signal to reproduce said image signal;
  (b) counting an amount of transition points of pixel color in at least one line of the coded signal being decoded in step (a);
  (c) calculating the required time for decoding the amount of code in said at least one line of the coded signal based on the amount of transition points counted in step (b);
  (d) comparing the calculated decoding time with a time required to print pixels obtained by decoding said at least one line of the coded signal;
  (e) converting the image signal obtained in step (a) to another coded signal which is coded using another coding than said predetermined coding, when the calculated decoding time is larger than said printing time.

3. A method of processing a coded signal according to claim 1 or 2, wherein said another coding in the step (e) is a non-compression mode coding.

4. A printing apparatus for printing a pixel signal derived by decoding a coded signal produced by predetermined coding of an image signal, comprising:
  (a) first decoding means for decoding at least one line of a coded signal into a first pixel signal;
  (b) means for counting an amount of code in said at least one line of the coded signal;
  (c) means for calculating the time required for decoding said at least one line of the coded signal based on the amount of code counted by said counting means;
  (d) means for comparing the calculated decoding time with a time required to print pixels obtained by decoding said at least one line of the coded signal;
  (e) means for converting said first pixel signal to another coded signal which is to another coded signal which is coded using another coding than said predetermined coding when the calculated decoding time is larger than said printing time;
  (f) first memory means for storing the coded signal produced by said means for converting when the calculated decoding time is larger than said printing time and for storing the coded signal decoded by said first decoding means when the calculating decoding time is smaller than said printing time;
  (g) second decoding means for decoding the coded signal stored in said first memory means into a second pixel signal;
  (h) second memory means for storing the second pixel signal; and
  (i) means for printing the second pixel signal stored in said second memory means.

5. A printing apparatus for printing a pixel signal derived by decoding a coded signal produced by predetermined coding of an image signal, comprising:

first decoding means for decoding at least one line of a coded signal into a first pixel signal;

(b) means for counting a number of transition points in said first pixel signal for said at least one line of said coded signal;

(c) means for calculating the time required for decoding said at least one line of coded signal based on the number of transition points counted by said means for counting;

(d) means for comparing the calculated decoding time with a time required to print pixels obtained by decoding said at least one line of the coded signal;

(e) means for converting said first pixel signal to another coded signal which is coded using another coding than said predetermined coding, when the calculated decoding time is larger than printing time;

(f) first memory means for storing the coded signal produced by said means for converting when the calculated decoding time is larger than said printing time and for storing the coded signal decoded by said first decoding means when the calculated decoding time is smaller than said printing time;

(g) second decoding means for decoding the coded signal stored in said first memory means into a second pixel signal;

(h) second memory means for storing the second pixel signal; and (i) means for printing the second pixel signal stored in said second memory means.

6. A printing apparatus according to claim 4 or 5, wherein the coded signal decoded by said first decoding means has been coded according to one of an MH code, an MR code and an MMR code.

7. A printing apparatus according to claim 4 or 5, wherein the coded signal produced by said means for converting is coded according to a non-compression mode code.

8. A facsimile apparatus having encoding means for encoding an image signal, code transmission means for transmitting a coded signal, code receiving means for receiving the transmitted code, decoding means for decoding the transmitted or received code, and a coded image printing apparatus, comprising:

(a) first decoding means for decoding at least one line of a coded signal into a first pixel signal;

(b) means for counting an amount of code in said at least one line of the code signal;

(c) means for calculating the required time for decoding said at least one line of the coded signal based on the amount of code counted by said counting means;

(d) means for comparing the calculated decoding time with a time required to print pixels obtained by decoding said at least one line of the coded signal;

(e) means for converting said first pixel signal to another coded signal which is coded using another coding than said predetermined coding when the calculated decoding time is larger than said printing time;

(f) first memory means for storing the coded signal produced by said means for converting when the calculated decoding time is larger than said printing time and for storing the coded signal decoded by said first decoding means when the calculated decoding time is smaller than said printing time;

(g) second decoding means for decoding the coded signal stored in said first memory means into a second pixel signal;

(h) second memory means for storing the second pixel signal; and (i) means for printing the second pixel signal stored in said second memory means.

9. A facsimile apparatus for communicating between a sending station and a receiving station through a facsimile apparatus, said facsimile apparatus having encoding means for encoding an image signal, code transmission means for transmitting a coded signal, code receiving means for receiving the transmitted code, decoding means for decoding the transmitted or received code, and a coded image printing apparatus, comprising:

(a) first decoding means for decoding at least one line of a coded signal into a first pixel signal;

(b) means for counting an amount of code in said at least one line of the code signal;

(c) means for calculating the time required for decoding said at least one line of the coded signal based on the amount of code counted by said counting means;

(d) means for comparing the calculated decoding time with a time required to print pixels obtained by decoding said at least one line of the coded signal;

(e) means for converting said first pixel signal to another coded signal which is coded using another coding than said predetermined coding when the calculated decoding time is larger than said printing time;

(f) first memory means for storing the coded signal produced by said means for converting when the calculated decoding time is larger than said printing time and for storing the coded signal decoded by said first decoding means when the calculated decoding time is smaller than said printing time;

(g) second decoding means for decoding the coded signal stored in said first memory means into a second pixel signal;

(h) second memory means for storing the second pixel signal; and (i) means for printing the second pixel signal stored in said second memory means.

10. A file apparatus having encoding means for encoding an image signal, memory means for storing a code signal in a memory medium, decoding means for decoding the coded signal stored in said memory medium, and a coded image printing apparatus, comprising:

(a) first decoding means for decoding at least one line of a coded signal into a first pixel signal;

(b) means for counting an amount of code in said at least one line of the code signal;

(c) means for calculating the time required for decoding said at least one line of the coded signal based on the amount of code counted by said counting means;

(d) means for comparing the calculated decoding time with a time required to print pixels obtained by decoding said at least one line of the coded signal;

(e) means for converting said first pixel signal to another coded signal which is coded using another coding than said predetermined coding when the calculated decoding time is larger than said printing time;

(f) first memory means for storing the coded signal produced by said means for converting when the calculated decoding time is larger than said printing time and for storing the coded signal decoded by said first decoding means when the calculated decoding time is smaller than said printing time;

(g) second decoding means for decoding the coded signal stored in said first memory means into a second pixel signal;

(h) second memory means for storing the second pixel signal; and (i) means for printing the second pixel signal stored in said second memory means;

11. A file communication system for communicating by connecting a plurality of file apparatuses, said file apparatuses having encoding means for encoding an image signal, memory means for storing a coded signal in a memory medium, decoding means for decoding the coded signal stored in said memory medium, and a coded image printing apparatus, comprising:

(a) first decoding means for decoding at least one line of a coded signal into a first pixel signal;

(b) means for counting an amount of code in said at least one line of the code signal;

(c) means for calculating the time required for decoding said at least one line of the coded signal based on the amount of code counted by said counting means;

(d) means for comparing the calculated decoding time with a time required to print pixels obtained by decoding said at least one line of the coded signal;

(e) means for converting said first pixel signal to another coded signal which is coded using another coding than said predetermined coding when the calculated decoding time is larger than said printing time;

(f) first memory means for storing the coded signal produced by said means for converting when the calculated decoding time is larger than said printing time and for storing the coded signal decoded by said first decoding means when the calculated decoding time is smaller than said printing time;

(g) second decoding means for decoding the coded signal stored in said first memory means into a second pixel signal;

(h) second memory means for storing the second pixel signal; and (i) means for printing the second pixel signal stored in said second memory means.

12. A facsimile apparatus having code transmission means for transmitting a coded signal, code receiving means for receiving coded signal and decoding means for decoding the transmitted or received coded signal into a pixel signal, comprising:

(a) means for encoding an image signal into a first coded signal using a predetermined coding;

(b) means for counting an amount of code in at least one of said first coded signal;

(c) means for calculating the time required for decoding said at least one line of said first coded signal based on the amount of code counted by said counting means;

(d) means for comparing the calculated decoding time with a time required to print pixels obtained by decoding said at least one line of said first coded signal;

(e) means for converting at least one line of said image signal into a second coded signal which is coded using a coding different from said predetermined coding when the calculated decoding time is larger than said printing time and for converting said at least one line of said image signal to a third coded signal which is coded using said predetermined coding when the calculated decoding time is smaller than said printing time;

(f) memory means for storing either said second coded signal or said third coded signal; and (g) means for transmitting the coded signal stored in said memory means.

13. A facsimile apparatus having code transmission means for transmitting a coded signal, code receiving means for receiving a transmitted coded signal and decoding means for decoding the transmitted or received coded signal into a pixel signal, comprising:

(a) means for encoding an image signal into a first coded signal using a predetermined coding;

(b) means for counting a number of transition points in at least one line of said first coded signal;

(c) means for calculating the time required for decoding said at least one line of said first coded signal based on the number of transition points counted by said means for counting;

(d) means for comparing the calculated decoding time with a time required to print pixels obtained by decoding said at least one line of said first coded signal;

(e) means for converting at least one line of said image signal into a second coded signal which is coded using a coding different from said predetermined coding when the calculated decoding time is larger than said printing time and for converting said at last one line of said image signal to a third coded signal which is coded using said predetermined coding when the calculated decoding time is smaller than said printing time;

(f) memory means for storing either said second coded signal or said third coded signal; and (g) means for transmitting the coded signal stored in said memory means.

14. A facsimile apparatus according to claim 12 or 13, further comprising means for producing an indication when said at least one line of said image signal is converted to said second coded signal by said means for converting.

* * * * *